H. FRANZ.
Glass-Tray.

No. 212,208. Patented Feb. 11, 1879.

Witnesses:
L. C. Fitler
Jno. K. Smith

Inventor
Henry Franz
by Bakewell & Kerr
Attorneys

UNITED STATES PATENT OFFICE.

HENRY FRANZ, OF PITTSBURG, PENNSYLVANIA, ASSIGNOR TO CAMPBELL, JONES & CO., OF SAME PLACE.

IMPROVEMENT IN GLASS TRAYS.

Specification forming part of Letters Patent No. 212,208, dated February 11, 1879; application filed January 2, 1879.

*To all whom it may concern:*

Be it known that I, HENRY FRANZ, of Pittsburg, in the county of Allegheny and State of Pennsylvania, have invented a new and useful Improvement in Glass Trays; and I do hereby declare the following to be a full, clear, and exact description thereof, reference being had to the accompanying drawings, forming part of this specification, in which—

Figure 1:
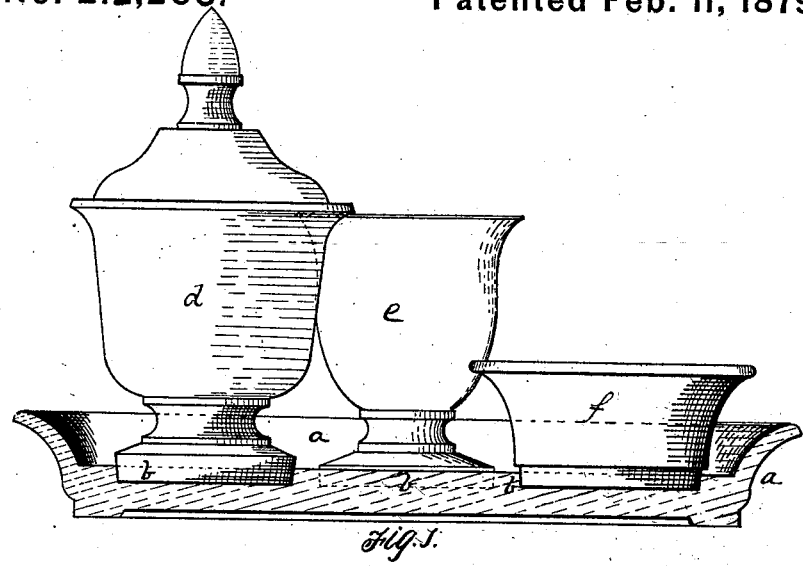
Figure 2:
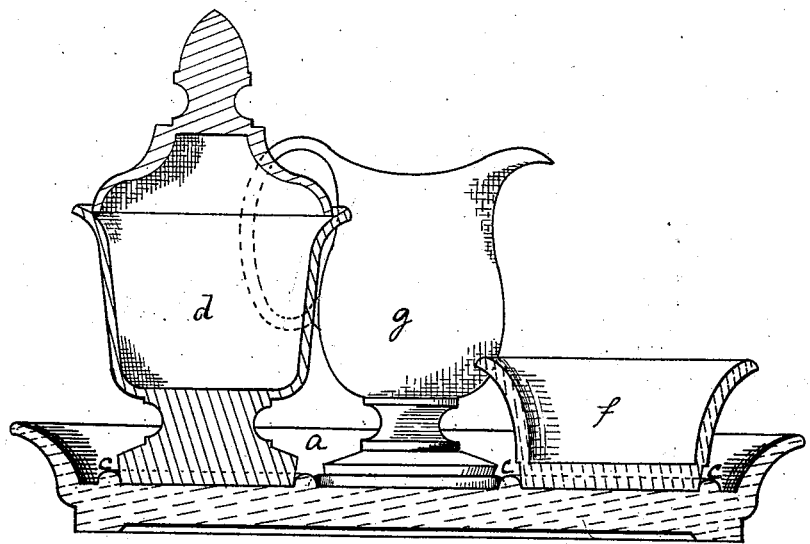

Figure 1 is a section of my improved glass tray, showing a portion of a tea-set of glassware thereon. Fig. 2 is a like view of a modified form.

Like letters indicate like parts wherever they occur.

My invention relates to the construction of a glass tray or salver, having recesses or seats, in which the dishes to be carried are placed, so that they may be carried with greater steadiness, and their slipping or sliding on the tray, and consequent frequent upsetting, breakage, and spilling of their contents from careless or unsteady carriage, is prevented.

To enable others skilled in the art to which it appertains to make and use the same, I will now proceed to describe my invention.

The tray $a$ is formed in a mold, in which the plastic material is placed, by means of a plunger having two or more projections on its face, corresponding to the bases of the articles to be used therewith, and which form the seats or recesses $b\ b$ on or in the upper face of the tray. The plunger is otherwise of the form and design necessary to press the molten glass into the desired pattern of sides and ornamentation. The mold corresponds also to the pattern desired. The seats or recesses $b$ may be formed by means of ridges or marces molded upon the face of the tray, as shown at $c\ c$, Fig. 2, or by projections arranged in circles at the desired point. These modifications are made by grooving or recessing the face of the plunger by which the plastic material is pressed in the mold.

The drawings, showing the dishes $f\ g\ d$ securely seated in the tray, illustrate clearly the invention. It is especially useful for carrying dishes in a crowded room, such as the supper-room at a ball, where almost invariably on every such occasion valuable dresses are injured, and often ruined, by the spilling of the contents of dishes carried upon trays of the ordinary forms. Another advantage is that this article can be produced with no additional expense but the additional work necessary in making the seat-forming configuration on the end of the plunger.

In the term "tray" I include also salvers, which are merely footed trays.

I make sets of table-furniture, such as, for instance, the tea-set shown, in which the tray and pieces of furniture are adapted to each other, so that the tray or salver and set may be considered as a unit.

What I claim as my invention, and desire to secure by Letters Patent, is—

A glass tray or salver having a series of seats or depressions adapted to receive a series of companion pieces, (dishes, &c.,) said pieces having bases corresponding to the seats or depressions in the tray or salver, substantially as and for the purpose specified.

In testimony whereof I, the said HENRY FRANZ, have hereunto set my hand.

HENRY FRANZ.

Witnesses:
 JNO. K. SMITH,
 JAMES H. PORTE.